Figure 1:
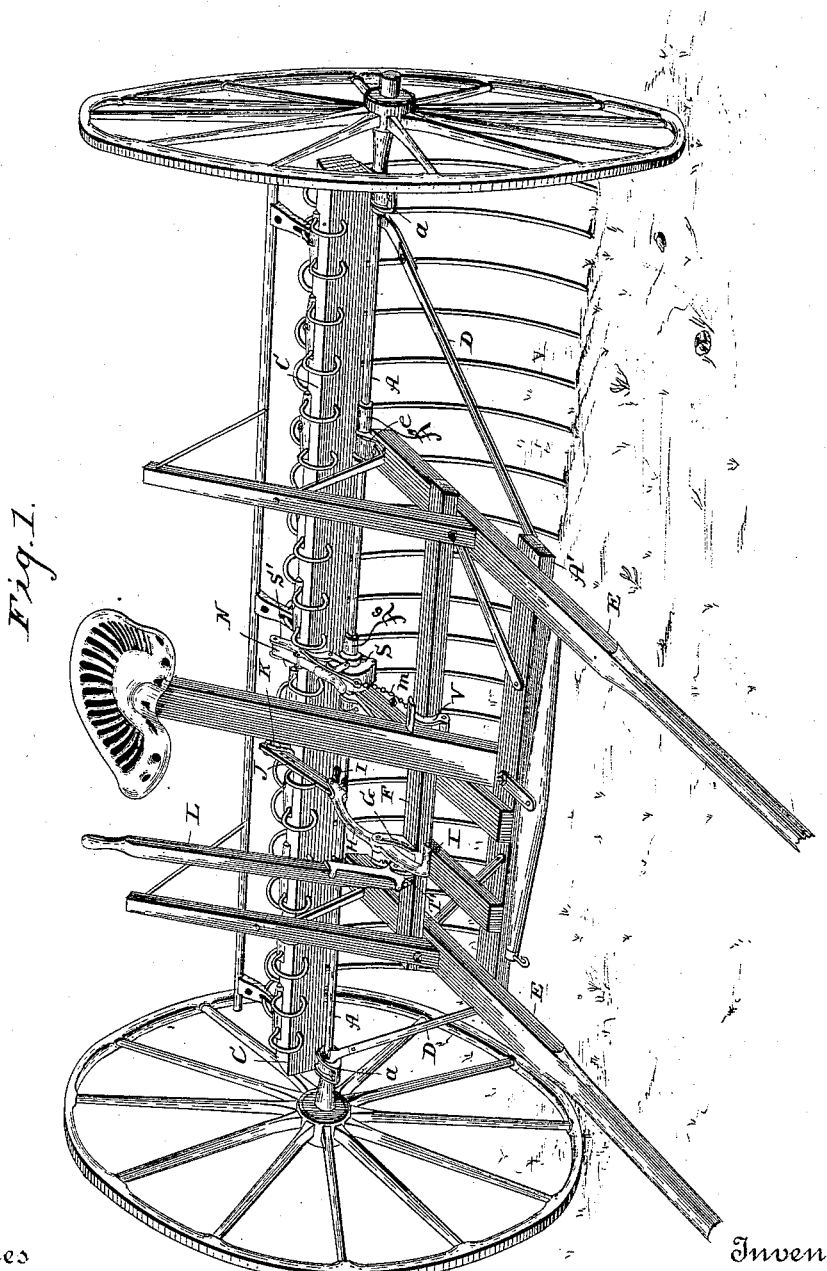

(No Model.) 2 Sheets—Sheet 1.

L. W. O'BRIAN.
HORSE RAKE.

No. 430,035. Patented June 10, 1890.

(No Model.) 2 Sheets—Sheet 2.
L. W. O'BRIAN.
HORSE RAKE.
No. 430,035. Patented June 10, 1890.
*Fig. 2.*
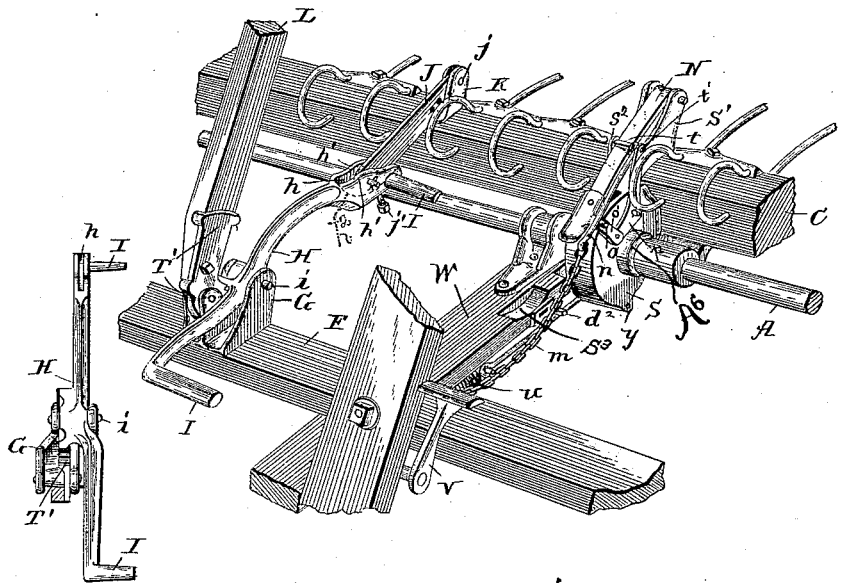
*Fig. 3.*
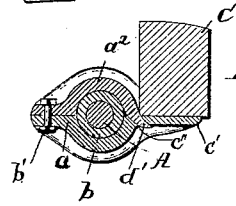
*Fig. 6.*
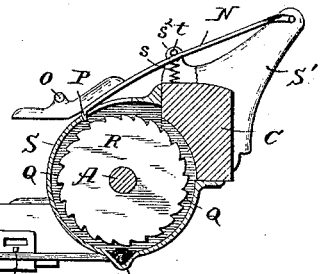
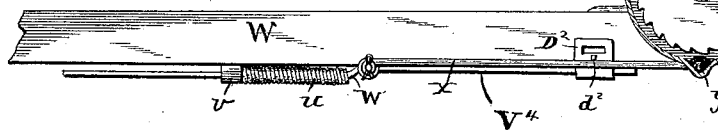
*Fig. 4.* *Fig. 5.*
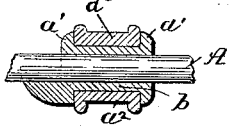
Witnesses
Edwin L Bradford
Frank Dorian
Inventor
Leonard W. O'Brian
By his Attorney in fact
Chas. E. Barbur

UNITED STATES PATENT OFFICE.

LEONARD W. O'BRIAN, OF BELLEVUE, OHIO, ASSIGNOR TO THE FREMONT CULTIVATOR COMPANY, OF SAME PLACE.

HORSE-RAKE.

SPECIFICATION forming part of Letters Patent No. 430,035, dated June 10, 1890.

Application filed June 15, 1888. Serial No. 277,225. (No model.)

*To all whom it may concern:*

Be it known that I, LEONARD W. O'BRIAN, a citizen of the United States, residing at Bellevue, in the county of Huron, State of Ohio, have invented a certain new and useful Improvement in Steel-Toothed Horse-Rakes, of which the following is so full, clear, and exact a description as will enable others skilled in the art to which my invention appertains to make and use the same, reference being had to the accompanying drawings, in which—

Figure 1 is a perspective view of a horse-rake equipped with my improvements. Fig. 2 is a detail perspective of the dumping mechanism. Fig. 3 is a transverse vertical section of the axle, rake-head clip, and pivotal brace. Fig. 4 is a front elevation of the same. Fig. 5 is a longitudinal vertical section of the same. Fig. 6 is a vertical section of the self-dumping mechanism.

The object of my invention is to construct a horse-rake which may be easily and quickly dumped in the shortest possible time with the slightest movement of the operator, and with the least expense of physical force on the part of the operator.

Another object of my invention is to construct a horse-rake which shall be so braced that the movements of the various parts of the rake shall be perfectly free in the directions in which they should move, and at the same time to have the structure so braced that all twisting, jolting, and unnecessary and disadvantageous movements of the various elements of the structure will be avoided and prevented by such bracing.

My device in detail is constructed as follows:

Referring to the accompanying drawings, A designates the axle of the rake, to which are secured the usual wheels provided with a ratchet-hub and ratchet, which will cause the rake to dump perfectly by the action of either wheel while driving straight ahead or in turning either to the right or left. I provide this rake with an automatic and a hand dumping mechanism, each of which operates a continuous rake-head C, one being operated by the continuous rotating steel axle, which dumps the rake automatically in a manner which will be hereinafter fully described. The hand dumping mechanism is secured to the continuous rake-head and to the cross-bar of the rake, and may be operated independent of or in conjunction with the automatic dumping mechanism, as may be found desirable and expedient. To the solid rake-head C are secured clips $a$ $a$, which are made in sections $a^2$ $a^2$ and bolted together around the pivotal brace D, which is rigidly secured to the shaft E and the cross-bar A' at its front end, while at its opposite end it has a sleeve or socket $b$, which encircles the axle A, and is provided with flanges $a'$ $a'$, between which flanges is secured to each brace-socket a clip $a^2$ on the rake-head C. The continuous axle A rotates freely within the perforated portion or socket $b$ of the brace D, while the end clip $a$ on the rake-head C has a partial rotation on the outer portion of the perforated end or socket $b$ of the brace D. Thus it will be seen that the rotary movement of the axle and the pivotal movement of the rake-head are perfectly free, while any vibration horizontally is avoided and prevented by the peculiar construction and action of the brace D. The shafts E are provided with shaft-clips $e$ $e$, in which rotates freely the axle A.

The clip $a$ is constructed as follows: The under section of the clip is provided with a flat flange $c'$, by means of which it is fastened to the under side of the rake-head, as shown in Fig. 3. This fastening may be of any kind without affecting my invention. At that point of the under section where the front surface of the rake-head would if prolonged intersect the flange $c'$ there is a slot cut, as shown at $c''$. The top section of the clip is jointed in front of the axle by a bolt $b'$, as shown in Figs. 3 and 4. At the back this top section is provided with a tongue $d'$, which is projected through the slot $c''$ of the under section before bolting. These two sections clip the sleeve $b$, which surrounds the axle A and prevents the brace D, to which said sleeve is attached, from lateral displacement.

The hand dumping mechanism of the rake is constructed as follows, and is located a little to the right of the driver's seat, where the foot of the operator may be used to aid in dumping the rake. To the cross-bar F the bracket G is rigidly secured, while to the top of the bracket is pivotally secured a double-ended trip-lever H, on each end of which is formed a horizontal foot projection I I. The rear end of this double-ended trip-lever H is pivotally connected with a dumping-bar J, which in turn is pivotally secured to a dumping-iron K at the point $j$. The dumping-bar J is adjustable at $j$ to regulate the length of the stroke of the dumping-lever and to facilitate the adjustment of the angle of the hand-lever L when in its normal position with the rake-teeth down. To this same bracket G, and in front of the pivotal point $i$ of the double-ended trip-lever H, is also pivotally secured a three-quarter gear T, which meshes with a corresponding section of gear on the double-ended trip-lever H. The gear T' is rigidly secured to the hand-lever L, by which the gear T is turned on its pivotal bearing on the bracket G as the dumping mechanism is operated.

From the foregoing, and by reference to Fig. 2 of the drawings, it will be seen at a glance that the operator can dump the rake himself with comparative ease by the use of the weight of his own body and one of his hands and one foot. The rear end of the double-ended trip-lever H is solid—that is to say, the recess or slot $h$ does not extend entirely through the end of the dumping-lever H, but it is simply a trough or groove formed at this point and having a bottom which connects the two flanges $h'$ $h'$, as is indicated by the dotted line $h^2$. The rake is locked in raking position when the bolt joining the dumping-bar J and the double-ended trip-lever H is as much above a true line between the bolt attaching the dumping-bar J to the dumping-iron K and the one attaching the trip-lever H to the fulcrum or bracket G as the rear end of the bottom of the slot in the trip-lever H will permit. This lock may be broken by pushing forward on the hand-lever L or by pressing with the foot on the rear pin, which projects from the trip-lever H, and which is located near the pivotal point of the trip-lever H and the dumping-bar J.

As arranged in the accompanying drawings, the gears cannot slip, the hand-lever works in a manner exactly opposite from the hand dumping-levers now in use, to wit: pulling back locks and moving forward dumps the rake. The angle of forward or backward inclinations at which the hand-lever L will stand may be varied and regulated at will by meshing the gears together with the hand-lever L set at any desired angle. This feature admirably adapts the rake to the use of larger or smaller persons or those with varying lengths of arms, &c. The position of the teeth in raking may be regulated at will through the medium of the series of perforations at the rear end portion of the dumping-bar J. The lock of the dumping mechanism should not be positive while the rake is being operated, and the lock is prevented from becoming positive by the use of a set-screw $j'$, which is located at the bottom of the slot in the rear end of the double-ended trip-lever H, and which abuts against the dumping-bar J just back of the pivot, so as to prevent the accidental rising of the pivot and consequent positive locking. Full description and illustration of this form of dumping mechanism is given in my concurrent application for Letters Patent for improvement in wheel horse-rakes, serially numbered 277,224. In the drawings thereto attached will be found full illustration of the action of the geared sectors.

The automatic dumping mechanism and reaction-force deadener operate to dump the rake automatically and to relieve the strain and jolting of the rake, as will be hereinafter described. To the solid rotating axle A is rigidly secured a wheel R, which wheel is provided with teeth Q Q, and it is incased in a casing S, which casing is rigidly secured to the rake-head. The casing moves with the wheel R when the two are locked together by the hook P, and it moves around the wheel R with the rake-head as soon as the hook P is released.

The automatic dumping mechanism is constructed as follows: The casing S is provided with a projection S', to the outer extremity of which is pivotally secured a tripping-bar N, said bar having the hook P at its front end. This tripping-bar N extends from its rear pivotal point to a point over the teeth in the wheel R, and it is held normally out of engagement with said teeth by the action of a spring $s$, which is between the bar and the rake-head, and which spring is located directly beneath a cross bolt or pin $t$, secured to and between the projections $s^2$ $s^2$. A little to the left of the seat is pivotally secured a foot-trip V, to which is secured a chain $m$, the rear end of which chain is secured to a rod $n$, which operates upon a pin $o$ on the end of the tripping-bar N. The rear end of the bar $n$ is pivoted at $t'$ to the rear arm of the bell-crank lever $p$. A link $o'$ extends from the pin $o$ to the forward arm of the bell-crank lever $p$, to which it is pivoted. The bell-crank $p$ is pivoted to the casing S, as shown in Fig. 2. It is evident that upon the depression of the forward arm of the bell-crank when the chain is pulled the rear arm will be raised, and the rod $n$ will be kept constantly in the same position relative to the tripping-bar N. By moving the foot-trip V forward the rod $n$ will be brought down into contact with the pin $o$ on the tripping-bar N, depressing it until the hook P engages with the teeth in the wheel R. This will cause the rake to dump, and the casing S will rotate with the wheel R until the forward end of the tripping-bar N abuts against a central bar W, which will automatically raise it out of engagement with the teeth Q and allow the rake-head and teeth by the force of their own gravity to fall back to a raking position. As the rake-head and teeth fall back, a sudden jar and jolt would be given to the operator, to the various parts of the rake, and to the horse were it not for the action of a spring $u$, which abuts against a lug or eyebolt $v$ at one end, encircles a rod $w$, which slides freely through the eyebolt or lug $v$, while the rear end of the coiled spring abuts against the forward end of a pivotal sliding link $x$, where it is pivotally secured to the rod $w$. The rear of the pivotal sliding rod $x$ is pivotally secured to an extension socket or stop $y$ on the lower side of the casing S. A bracket $D^2$, provided with a side pin $d^2$, may be secured to the middle bar W, and the casing S may be located about in alignment with the same side of the central bar W in such a manner that the tripping-bar N will be disengaged from the wheel R by its forward end abutting against the pin $d^2$, instead of having it abut against the top of the middle bar W, as is also shown in Fig. 2. This, however, is a matter of comparative indifference, as the device will work when constructed either way.

In Fig. 6 the bar $x$ is shown above the pin $d^2$, as is the construction when said pin is used as a tripping-pin. In Fig. 2 $d^2$ is shown merely in position to supplement Fig. 6.

It will be readily understood that the set-screw $j'$ in the rear portion of the double-ended trip-lever H will enable the operator to secure the exact rigidity of lock required, and the amount of force required to break this lock may be determined to a nicety by the adjustment of this set-screw. The farther up the set screw is turned the lighter will be the lock, and vice versa. It will be readily understood, also, that the brace D, constructed to encircle the axle as it does, forms a most admirable bracing for the shafts, holding them against lateral twisting and displacement, while the rake-head and teeth may be tilted at any angle without friction or binding caused by the brace and its connections.

Referring to the automatic reaction-force deadener, it will be seen at a glance that as soon as the tripping-bar N and ratchet-wheel R are disengaged the head and teeth will begin to descend to a raking position. This will cause the pivotal bar $x$ to move forward, compressing the spring $u$, the resistance of which will prevent the head and teeth from returning to a raking position with any shock. The action of this spring is continuous during the fall of the teeth, as the end of the bar $x$ is always held by and against the socket or stop extension $y$. This is a feature of prime importance in this connection, as the jolting caused by the sudden fall of the teeth and head-bar without this force-deadening device is such as to wrench and twist parts of the rake in such a manner as to get them out of order and to cause undue and unnecessary fatigue to the operator and the horse by reason of such jolting. The action of the spring $u$ is such as to aid the rake head and teeth in starting upward as soon as the tripping-bar N is brought into engagement with the ratchet-wheel R.

The shoulders $A^6$ are bored to receive the axle, and serve as bearings for said axle. They are attached in the ordinary way to the rake-head.

The bar W may or may not be recessed, as shown at $S^3$, to receive the end of the tripping-bar. This is a matter of indifference, and sometimes the recess facilitates the automatic dropping of the rake; but it is not essential. The bar W is also strengthened by additional material, (shown at $V^4$;) but this is not always necessary, the presence or absence of this re-enforcing depending on the strength of the material used.

Having now described the objects, uses, and advantages of my invention and fully set forth a preferred means of construction, what I believe to be new, and desire to secure by Letters Patent of the United States, and what I therefore claim, is—

1. In a rake, a rake-head, a rotating axle provided with a toothed wheel, and a case attached to said rake-head encircling said wheel and provided with a backward projection, in combination with a tripping-bar hooked at the end, pivoted to said projection, and supported by a spring, a bell-crank pivoted to said case and provided with a link connected to the tripping-bar, and a rod $n$, connected to the opposite arm of the bell-crank, and a chain to depress said rod, as described.

2. In a rake, a rotating axle, and rake-frame, and rake-head, in combination with a brace extending from the rake-frame to the axle, to which it is connected by the clip on the rake-head, by which the head is sleeved on the axle, all constructed substantially as described, whereby the axle and rake-head are free to move pivotally on the brace and all twisting and distortion of the rake laterally is prevented, substantially as described.

3. In a rake, a rotating axle, a frame, and a rake-head, in combination with a brace secured to the rake-frame and encircling the axle, and clips made in sections, which encircle the ends of the braces and are secured to the rake-head, substantially as described, whereby the rake-head has free pivotal movement on the braces and the axle has free pivotal movement within the same, substantially as and for the purposes specified.

4. In a rake, an axle, frame, and pivotal rake-head, in combination with braces secured to the frame and provided with end sockets having flanges and clips encircling the sockets of the braces and held in place by the flanges on their sockets, said clips being secured to the rake-head, substantially as and for the purposes specified.

In testimony whereof I affix my signature in the presence of two witnesses.

LEONARD W. O'BRIAN.

Witnesses:
GILBERT E. HALL,
WALTER J. SMITH.